United States Patent
Fulton et al.

(10) Patent No.: US 9,630,873 B2
(45) Date of Patent: Apr. 25, 2017

(54) FLOAT GLASS COMPOSITION ADAPTED FOR CHEMICAL STRENGTHENING

(71) Applicant: Guardian Industries Corp., Auburn Hills, MI (US)

(72) Inventors: Kevin R. Fulton, Howell, MI (US); Kirk McMenamin, Grosse Ile, MI (US); Glenn A. Cerny, Canton, MI (US); Zhaoyu Wang, Canton, MI (US); Samuel Olson, Westland, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 14/658,885

(22) Filed: Mar. 16, 2015

(65) Prior Publication Data
US 2016/0272533 A1    Sep. 22, 2016

(51) Int. Cl.
*C03C 3/087*    (2006.01)
*C03C 21/00*    (2006.01)

(52) U.S. Cl.
CPC ............ *C03C 3/087* (2013.01); *C03C 21/002* (2013.01)

(58) Field of Classification Search
CPC ........ C03C 3/087; C03C 21/00; C03C 21/002
See application file for complete search history.

(56) References Cited

U.S. PATENT DOCUMENTS

| 4,671,814 | A | * | 6/1987 | Aratani | C03C 21/00 428/410 |
| 5,071,796 | A | * | 12/1991 | Jones | C03C 3/087 501/69 |
| 5,773,148 | A | | 6/1998 | Charrue et al. | |
| 7,871,703 | B2 | | 1/2011 | Shelestak et al. | |
| 8,518,545 | B2 | | 8/2013 | Akiba et al. | |
| 8,828,545 | B2 | | 9/2014 | Sun et al. | |
| 2013/0059160 | A1 | | 3/2013 | Veerasamy et al. | |
| 2013/0059717 | A1 | | 3/2013 | Veerasamy et al. | |
| 2013/0101798 | A1 | | 4/2013 | Hashimoto | |
| 2013/0302617 | A1 | | 11/2013 | Akiba et al. | |
| 2014/0226090 | A1 | | 8/2014 | Akiba et al. | |
| 2014/0302330 | A1 | | 10/2014 | Okahata et al. | |

FOREIGN PATENT DOCUMENTS

| GB | 2 337 516 | | 11/1999 |
| JP | 2007031211 | A * | 2/2007 |

OTHER PUBLICATIONS

U.S. Appl. No. 13/137,696, filed Sep. 2, 2011; Veerasamy et al.

* cited by examiner

*Primary Examiner* — Elizabeth A Bolden
(74) *Attorney, Agent, or Firm* — Nixon & Vanderhye P.C.

(57) ABSTRACT

Float glass compositions adapted for chemical strengthening, and methods of making the same. Certain example embodiments of this invention relate to such a glass composition having improved ion-exchanged, surface durability, and/or mechanical properties for use in applications where higher strength and improved durability of the glass are desired.

25 Claims, No Drawings

FLOAT GLASS COMPOSITION ADAPTED FOR CHEMICAL STRENGTHENING

This invention relates to float glass compositions adapted for chemical strengthening, and methods of making the same. Certain example embodiments of this invention relate to such a glass composition having improved ion-exchanged, surface durability, and/or mechanical properties for use in applications where higher strength and improved durability of the glass are desired. Such glass compositions are useful, for example, in glass for windows in the architectural and/or automotive industry(ies) or as cover glass for display devices.

BACKGROUND OF THE INVENTION

Two types of glass strengthening (tempering) are known in the art. The most popular is thermal tempering, which involves heat and quenching. The heat treatment used in thermal tempering is typically over 580 degrees C., and mostly over 600 degrees C. The second type of glass strengthening is known as chemical strengthening (or chemical tempering).

Chemically strengthened glass is a type of glass that has increased strength as a result of a chemical process that is performed after the base glass is made. When broken, it still shatters in long pointed splinters. For this reason, it is often laminated when used in safety glass applications. However, chemically strengthened glass is typically much stronger (e.g., six to eight times stronger) than non-chemically strengthened float glass. The chemical strengthening process by an ion-exchange is often a process by which the metal ions (for example, Na ions) having a smaller radius contained in glass are replaced by ions (for example K ions) having a larger radius contained in the glass to generate a compressive stress layer on a glass surface, and improve the glass strength. A chemical strengthening method is to replace alkali metal ions (typically Li ions and/or Na ions) having a smaller ion radius existing on the glass plate surface with alkali ions (e.g., Na ions and/or K ions for Li ions, or K ions for Na ions) having a larger ion radius by ion exchange at temperatures lower than or equal to a glass transition point. Example chemical strengthening processes are described in, for example and without limitation, U.S. Patent Document Nos. 2014/0302330, 2013/0101798, and application Ser. No. 13/137,696. the disclosures of which are all incorporated herein by reference.

The glass is typically chemically strengthened by a surface finishing process. For instance, glass may be submersed in a bath containing a potassium salt (typically potassium nitrate) at a high temperature such as around 300° C. This causes sodium ions in the glass surface to be replaced by potassium ions from the bath solution. These potassium ions are larger than the sodium ions and therefore wedge into the gaps left by the smaller sodium ions when they migrate to the potassium nitrate solution. This replacement of ions causes the surface of the glass to be in a state of compression and the core in compensating tension.

Another example chemical strengthening process is a multi-stage process in which the glass is first immersed in a sodium nitrate bath at a high temperature such as around 430-450° C., which enriches the surface with sodium ions. This leaves more sodium ions on the glass for the immersion in potassium nitrate to replace with potassium ions. In this way, the use of a sodium nitrate bath increases the potential for surface compression in the finished article. In any event, chemical strengthening results in a strengthening similar to toughened glass. However, the process does not use extreme variations of temperature (e.g., temperatures over 580 or 600 degrees C. are not needed) and therefore chemically strengthened glass has little or no bow or warp, optical distortion or strain pattern.

Conventional float glass often has a composition as follows,

| Ingredient | wt. % |
| --- | --- |
| $SiO_2$ | 71.18% |
| $Al_2O_3$ | 1.02% |
| $Na_2O$ | 13.52% |
| $K_2O$ | 0.24% |
| $CaO$ | 8.76% |
| $MgO$ | 3.99% |
| $Fe_2O_3$ (total iron) | 0.09% |
| $SO_3$ | 0.20% |

This conventional float glass, before any chemical strengthening, has a strain temperature (log $\eta$=14.5) of 519 degrees C., a cool time (secs) of 100.99, a USPXXIII (ml) of 6.14, a glass molar volume ($cm^3$) of 23.67, a Young's modulus (GPa) of 72.2, a shear modulus (GPa) of 29.6, a non-bridging oxygen (NBO) of 17.81, and a %NBO of 29.54.

Unfortunately, it has been found that the above-identified conventional float glass compositions is not well suited for chemical strengthening. Following chemical strengthening, the "depth of layer" in the glass indicates the depth of the compressive stress layer in the glass after the ion exchange of the chemical tempering process. The deeper the layer, the stronger the glass. Thus, a higher "depth of layer" is desirable following chemical strengthening because it provides for better impact resistance and better scratch resistance in chemically strengthened glass (compared to a thinner layer). The "depth of layer" for the above-identified conventional float glass following chemical strengthening is undesirably small/thin, and thus does not provide for a high degree of impact and scratch resistance which may be desirable in certain instances. For example, following a four hour ion-exchange chemical strengthening process at 435 degrees C. which resulted in maximum compressive stress (MPa) of 710.6 MPa, the "depth of layer" of the above-identified conventional float glass was only 10.5 μm. This thickness of the compressive stress layer ("depth of layer") is undesirable low/thin.

In view of the above, it is apparent that there exists a need in the art for a glass composition which may achieve a larger (deeper) "depth of layer" upon chemical strengthening, and thus improved impact and/or scratch resistance.

SUMMARY OF EXAMPLE EMBODIMENTS OF THE INVENTION

An example embodiment of this invention is float glass comprising: a float glass composition that is adapted to be chemically strengthened and that includes:

| Ingredient | (wt. %) |
| --- | --- |
| $SiO_2$ | 67-69.5% |
| $Al_2O_3$ | 2.5-4.5% |
| optionally ($SiO_2 + Al_2O_3$) | <73% |
| $Na_2O$ | 16.6-20% |
| $K_2O$ | 0.5-2.0% |
| $CaO$ | 4.0-7.0% |

-continued

| Ingredient | (wt. %) |
|---|---|
| MgO | 2.5-3.5% |
| optionally CaO + MgO | 6.5-10.5% |
| optionally CaO %/MgO % | 1.1-3.5. |

The float glass may be chemically strengthened and have a depth of layer, which is depth of a compressive stress layer in the glass resulting from the chemical strengthening, with a 4 hour chemical strengthening process at 435 degrees C. being used as a reference, of at least 25 μm. Other chemical strengthening times and temperatures may of course be used.

DETAILED DESCRIPTION OF EXAMPLE EMBODIMENTS OF THE INVENTION

Glasses according to different embodiments of this invention may be used, for example, in architectural glass applications (e.g., in monolithic and/or IG window units), in the automotive industry (e.g., windshields, backlites, side windows, etc.), and/or in other suitable applications such as cover glass for display devices. Such glasses may be clear or colored in various manners via various colorants if desired.

Certain glasses according to this invention utilize soda-lime-silica flat glass made via the float process as their base composition/glass, to which may be added certain ingredients for making up an optional colorant portion.

Conventional float glass composition is modified so that the glass temperature viscosity curve will be altered to reduce the low temperature structural relaxation (log 14.5 →strain point) by 20-40 degrees C., more preferably by 25-35 degrees C. (compared to the conventional glass above). The modified composition may also change the mechanical properties of the base glass composition and enable improved ion-exchange strengthening compared to the above conventional float glass composition. These improvements result in a significantly deeper (larger) "depth of layer" meaning that the depth of the compressive stress layer following chemical strengthening is significantly increased compared to the above conventional glass composition, with a possible small reduction in maximum compressive stress under a conventional ion exchange process. Base glass, according to example embodiments of this invention, may be made on a conventional float line, with the optional chemical strengthening then being performed at a different location if desired. Float glass, according to example embodiments of this invention, may be used for chemical strengthened glass applications, but need not be chemically strengthened in other applications.

An exemplary soda-lime-silica base float glass according to certain embodiments of this invention (with respect to "examples of invention" and "more preferred ranges" of embodiments of this invention), on a weight percentage basis (Wt. %), includes the following basic ingredients (compared to the "conventional" float glass discussed above in the background section):

TABLE 1

| Ingredient | Conventional | Examples of Invention | More Preferred Ranges |
|---|---|---|---|
| SiO$_2$ | 71.18% | 67-69.5% | 67.5-68.5% |
| Al$_2$O$_3$ | 1.02% | 2.5-4.5% | 2.7-3.4% |
| (SiO$_2$ + Al$_2$O$_3$) | 72.20% | <73% | 70.5-71.5% |

TABLE 1-continued

| Ingredient | Conventional | Examples of Invention | More Preferred Ranges |
|---|---|---|---|
| Na$_2$O | 13.52% | 16.6-20% | 18-19% |
| K$_2$O | 0.24% | 0.5-2.0% | 0.6 to 1.2% |
| CaO | 8.76% | 4.0-7.0% | 5.0-7.0% (or 5.5-6.5%) |
| MgO | 3.99% | 2.5-3.5% | 2.8-3.2% |
| CaO + MgO | 12.75% | 6.5-10.5% | 7.5-10.5% (or 8.5-9.7%) |
| CaO %/MgO % | 2.20 | 1.1-3.5 | 1.4 to 3.5 (or 1.8-2.3) |

Other minor ingredients, including various conventional and refining aids, such as SO$_3$ (e.g., from 0.2 to 0.4%, with an example being 0.31%), carbon, gypsum, and/or the like may also be included in the base glass. Colorants such as iron (e.g., from 0.07 to 0.3%, with an example being 0.08%), cobalt, erbium, or the like may also be included in the glass. In certain embodiments, for example, glass herein may be made from batch raw materials silica sand, soda ash (or NaOH as a soda source), dolomite, limestone, with the use of salt cake (SO$_3$) and/or Epsom salts (e.g., about a 1:1 combination of both) as refining agents. Reducing agent(s) such as Si (metallic), Si, silicon monoxide, SiO, sucrose, and/or carbon may also be used.

It can be seen from the table above that float glass compositions according to example embodiments of this invention have less SiO$_2$ than the conventional float glass, more Al$_2$O$_3$ than the conventional float glass, more Na$_2$O than the conventional float glass, optionally more K$_2$O than the conventional float glass, less CaO than the conventional float glass, and optionally less MgO than the conventional float glass. Float glass according to example embodiments of this invention has a lower strain temperature (log η=14.5) [e.g., from 470-500 degrees C., more preferably from 480-492 degrees C., with an example being 488 degrees C.] compared to the conventional float glass discussed above which lower strain point allows for accepting more K ions during chemical strengthening and thus a higher "depth of layer" after chemical strengthening, a higher cool time (e.g., 113 seconds) compared to the conventional float glass discussed above, a higher USPXXIII (ml) (e.g., 15.73) compared to the conventional float glass discussed above, a higher glass molar volume (cm$^3$) (e.g., 24.13) compared to the conventional float glass discussed above which indicates improved durability, a higher Young's modulus (GPa) (e.g., from 74-76.5 GPa, more preferably from 74.5 to 75.5 GPa, with an example being 75.06) compared to the conventional float glass discussed above which indicates improved durability, a higher shear modulus (GPa) (e.g., from 30-31.5 GPa, more preferably from 30.5 to 31.25 GPa, with an example being 30.76) compared to the conventional float glass discussed above which indicates improved durability, a lower non-bridging oxygen (NBO) (e.g., 13.60) and a lower %NBO (e.g., from 20-25%, more preferably from 22.0-24.0%, with an example being 23.04%) compared to the conventional float glass discussed above which indicate improved chemical durability.

An example of a float glass according to an example embodiment of this invention, using a float glass process on a tin bath, is set forth below.

EXAMPLE OF INVENTION

TABLE 2

| Ingredient | Example 1 (Wt. %) |
| --- | --- |
| $SiO_2$ | 68.10% |
| $Al_2O_3$ | 2.92% |
| ($SiO_2 + Al_2O_3$) | 71.02% |
| $Na_2O$ | 18.45% |
| $K_2O$ | 0.82% |
| CaO | 6.08% |
| MgO | 3.05% |
| CaO + MgO | 9.13% |
| CaO %/MgO % | 1.99 |
| $SO_3$ | 0.31% |
| $Fe_2O_3$ (total iron) | 0.08% |

After being made via the float process on a tin bath, the glass of Example 1 was chemically strengthened via an ion exchange strengthening process for four hours at 435 degrees C. This was the same chemical strengthening process that all other examples herein, including the comparative examples and the conventional float glass discussed above, were subjected to. Following this chemical strengthening process, the glass of Example 1 had a maximum compressive stress of about 530 MPa, and a "depth of layer" of 26.3 µm. Following this same chemical strengthening process, except for six hours instead of four hours, the glass of Example 1 had a maximum compressive stress of about 487 MPa, and a "depth of layer" of 28.2 µm. Following this same chemical strengthening process, except for eight hours instead of four hours, the glass of Example 1 had a maximum compressive stress of about 487 MPa, and a "depth of layer" of 33.7 µm. The bulk glass composition remains the same before and after the chemical heat strengthening, although the surface area will change slightly for example with potassium replacing sodium in the surface area for the "depth of layer" for the chemical strengthening surface stress increase. In certain example embodiments of this invention, after such a four hour chemical strengthening, the glass has a "depth of layer" of at least 25 µm, more preferably at least 26 µm, even more preferably at least 27 µm, and most preferably at least 30 µm. And the maximum surface stress in the "depth of layer" area is preferably from 450-550 MPa in example embodiments of this invention.

It can be seen that the glass composition of Example 1 was significantly improved compared to the conventional float glass discussed above, in that the "depth of layer" significantly increased with the modified glass composition of Example 1. In particular, the "depth of layer" after the same four hour chemical strengthening was 26.3 µm in the float glass of Example 1, whereas it was only 10.5 µm in the conventional float glass. This means that the glass of Example 1 was significantly more durable, impact resistant, and scratch resistant than the conventional float glass.

OTHER COMPARATIVE EXAMPLES

Other Comparative Examples are as follows. These Comparative Examples were subjected to the same chemical strengthening process as Example 1 above.

Comparative Example 1

TABLE 3

| Ingredient | (Wt. %) |
| --- | --- |
| $SiO_2$ | 67.78% |
| $Al_2O_3$ | 2.03% |
| $Na_2O$ | 18.51% |
| $K_2O$ | 0.83% |
| CaO | 7.19% |
| MgO | 3.10% |
| $SO_3$ | 0.31% |
| $Fe_2O_3$ (total iron) | 0.08% |

Thus, it can be seen that Comparative Example 1 had 1.11% more CaO and 0.89% less $Al_2O_3$ than did Example 1. It will be shown below that this significantly reduced the "depth of layer" following chemical strengthening in an undesirable manner. After being made via the float process on a tin bath, the glass of Comparative Example 1 was chemically strengthened via the same ion exchange strengthening process for four hours at 435 degrees C. This was the same chemical strengthening process that all other examples herein, including the comparative examples and the conventional float glass discussed above, were subjected to. Following this chemical strengthening process, the glass of Comparative Example 1 had a maximum compressive stress of about 548 MPa, and a "depth of layer" of 20.4 µm (compared to 26.3 µm for Example 1). Following this same chemical strengthening process, except for six hours instead of four hours, the glass of Comparative Example 1 had a maximum compressive stress of about 520 MPa, and a "depth of layer" of 26.1 µm (compared to 28.2 µm for Example 1). Following this same chemical strengthening process, except for eight hours instead of four hours, the glass of Comparative Example 1 had a maximum compressive stress of about 469 MPa, and a "depth of layer" of 28.7 µm (compared to 33.7 µm for Example 1). Following this same chemical strengthening process, except for twelve hours instead of four hours, the glass of Comparative Example 1 had a maximum compressive stress of about 432 MPa, and a "depth of layer" of 34.5 µm (compared to 39.9 µm for Example 1 after 12 hours). Thus, it can be seen that the higher CaO content and the lower alumina content of Comparative Example 1 surprisingly resulted in an undesirably lower "depth of layer" than Example 1, meaning that these changes reduced the durability, scratch resistance, and impact resistance of the glass in an undesirable manner.

Comparative Example 2 is as follows. cl Comparative Example 2

TABLE 4

| Ingredient | (Wt. %) |
| --- | --- |
| $SiO_2$ | 68.40% |
| $Al_2O_3$ | 1.13% |
| $Na_2O$ | 18.21% |
| $K_2O$ | 0.81% |
| CaO | 7.91% |
| MgO | 2.98% |
| $SO_3$ | 0.30% |
| $Fe_2O_3$ (total iron) | 0.08% |

Thus, it can be seen that the float glass of Comparative Example 2 had 1.83% more CaO and 1.79% less $Al_2O_3$ than did the float glass of Example 1. It will be shown below that this significantly reduced the "depth of layer" following chemical strengthening in an undesirable manner. After being made via the float process on a tin bath, the glass of Comparative Example 2 was chemically strengthened via the same ion exchange strengthening process for four hours at 435 degrees C. This was the same chemical strengthening process that all other examples herein, including the comparative examples and the conventional float glass discussed above, were subjected to. Following this chemical strengthening process, the glass of Comparative Example 2 had a maximum compressive stress of about 542 MPa, and a "depth of layer" of 19.5 µm (compared to 26.3 µm for Example 1). Following this same chemical strengthening process, except for six hours instead of four hours, the glass of Comparative Example 2 had a maximum compressive stress of about 512 MPa, and a "depth of layer" of 24.2 µm (compared to 28.2 µm for Example 1). Following this same chemical strengthening process, except for eight hours instead of four hours, the glass of Comparative Example 2 had a maximum compressive stress of about 462 MPa, and a "depth of layer" of 26.3 µm (compared to 33.7 µm for Example 1). Following this same chemical strengthening process, except for twelve hours instead of four hours, the glass of Comparative Example 2 had a maximum compressive stress of about 430 MPa, and a "depth of layer" of 31.4 µm (compared to 39.9 µm for Example 1 after 12 hours). Thus, it can be seen that the higher CaO content and the lower alumina content of Comparative Example 2 surprisingly resulted in an undesirably lower "depth of layer" than Example 1, meaning that these changes reduced the durability, scratch resistance, and impact resistance of the glass in an undesirable manner.

Comparative Example 3 is as follows.

Comparative Example 3

TABLE 5

| Ingredient | (Wt. %) |
|---|---|
| $SiO_2$ | 69.99% |
| $Al_2O_3$ | 3.01% |
| $Na_2O$ | 16.40% |
| $K_2O$ | 0.83% |
| CaO | 6.07% |
| MgO | 3.20% |
| $SO_3$ | 0.24% |
| $Fe_2O_3$ (total iron) | 0.09% |

Thus, it can be seen that Comparative Example 3 had 1.89% more $SiO_2$ and 2.05% less $Na_2O$ than did Example 1. It will be shown below that this significantly reduced the "depth of layer" following chemical strengthening in an undesirable manner. After being made via the float process on a tin bath, the glass of Comparative Example 3 was chemically strengthened via the same ion exchange strengthening process for four hours at 435 degrees C. This was the same chemical strengthening process that all other examples herein, including the comparative examples and the conventional float glass discussed above, were subjected to. Following this chemical strengthening process, the glass of Comparative Example 3 had a maximum compressive stress of about 664 MPa, and a "depth of layer" of 19.4 µm (compared to 26.3 µm for Example 1). Following this same chemical strengthening process, except for six hours instead of four hours, the glass of Comparative Example 3 had a maximum compressive stress of about 619 MPa, and a "depth of layer" of 24.8 µm (compared to 28.2 µm for Example 1). Following this same chemical strengthening process, except for eight hours instead of four hours, the glass of Comparative Example 3 had a maximum compressive stress of about 592 MPa, and a "depth of layer" of 28.3 µm (compared to 33.7 µm for Example 1). Following this same chemical strengthening process, except for twelve hours instead of four hours, the glass of Comparative Example 3 had a maximum compressive stress of about 591 MPa, and a "depth of layer" of 35.2 µm (compared to 39.9 µm for Example 1 after 12 hours). Thus, it can be seen that the higher $SiO_2$ content and the lower $Na_2O$ content of Comparative Example 3 surprisingly resulted in an undesirably lower "depth of layer" than Example 1, meaning that these changes reduced the durability, scratch resistance, and impact resistance of the glass in an undesirable manner.

An example embodiment of this invention is float glass comprising: a float glass composition that is adapted to be chemically strengthened and that includes:

| Ingredient | (wt. %) |
|---|---|
| $SiO_2$ | 67-69.5% |
| $Al_2O_3$ | 2.5-4.5% |
| ($SiO_2$ + $Al_2O_3$) | <73% |
| $Na_2O$ | 16.6-20% |
| $K_2O$ | 0.5-2.0% |
| CaO | 5.0-7.0% or 4.0-7.0% |
| MgO | 2.5-3.5% |
| CaO + MgO | 7.5-10.5% or 6.5-10.5% |
| CaO %/MgO % | 1.4-3.5 or 1.1-3.5%. |

The float glass of the immediately preceding paragraph may be chemically strengthened and have a depth of layer, which is depth of a compressive stress layer in the glass resulting from the chemical strengthening, with a 4 hour chemical strengthening process at 435 degrees C. being used as a reference, of at least 25 µm.

The float glass of any of the preceding two paragraphs may be chemically strengthened and have a depth of layer, which is depth of a compressive stress layer in the glass resulting from the chemical strengthening, with a 4 hour chemical strengthening process at 435 degrees C. being used as a reference, of at least 26 µm.

The float glass of any of the preceding three paragraphs may have a compressive stress layer (due to chemical strengthening) that has a maximum surface stress of from 450-550 MPa.

The float glass of any of the preceding four paragraphs may have a Young's modulus of from 74-76.5 GPa, more preferably from 74.5-75.5 GPa.

The float glass of any of the preceding five paragraphs may have a visible transmission Lta of at least about 50%, more preferably of at least 60%, and most preferably of at least 70%.

The float glass of any of the preceding six paragraphs may comprise from 67.5-68.5 $SiO_2$.

The float glass of any of the preceding seven paragraphs may comprise from 2.7-3.4% $Al_2O_3$.

The float glass of any of the preceding eight paragraphs may comprise from 18-19% $Na_2O$.

The float glass of any of the preceding nine paragraphs may comprise from 5.5-6.5% CaO.

The float glass of any of the preceding ten paragraphs may comprise from 2.8-3.2% MgO.

The float glass of any of the preceding eleven paragraphs may comprise from 8.5-9.7% CaO +MgO.

In the float glass of any of the preceding twelve paragraphs, the ratio CaO%/MgO% may be from 1.8 to 2.3.

The float glass of any of the preceding thirteen paragraphs may two, three, or all four of: (i) from 67.5-68.5 $SiO_2$, (ii) from 2.7-3.4% $Al_2O_3$, (iii) from 18-19% $Na_2O$, and (iv) from 5.5-6.5% CaO.

An example embodiment of this invention is chemically strengthened float glass comprising: a float glass composition that is chemically strengthened and includes:

| Ingredient | (wt. %) |
|---|---|
| $SiO_2$ | 67-69.5% |
| $Al_2O_3$ | 2.5-4.5% |
| optionally $SiO_2 + Al_2O_3$ | <73% |
| $Na_2O$ | 16.6-20% |
| $K_2O$ | 0.5-2.0% |
| CaO | 5.0-7.0% or 4.0-7.0 |
| MgO | 2.5-3.5% |
| optionally CaO + MgO | 7.5-10.5% or 6.5-10.5 |
| optionally CaO %/MgO % | 1.4-3.5 or 1.1-3.5 | wherein the glass has a depth of layer, which is depth of a compressive stress layer in the glass resulting from the chemical strengthening, of at least 25 µm.

The float glass of the immediately preceding paragraph may have a compressive stress layer that has a maximum surface stress of from 450-550 MPa.

The float glass of any of the preceding two paragraphs may comprise from 67.5-68.5 $SiO_2$.

The float glass of any of the preceding three paragraphs may comprise from 2.7-3.4% $Al_2O_3$.

The float glass of any of the preceding four paragraphs may comprise from 18-19% $Na_2O$.

The float glass of any of the preceding five paragraphs may comprise from 5.5-6.5% CaO.

The float glass of any of the preceding six paragraphs may comprise one, two, three or all four of: (i) from 67.5-68.5 $SiO_2$, (ii) from 2.7-3.4% $Al_2O_3$, (iii) from 18-19% $Na_2O$, and (iv) from 5.5-6.5% CaO.

Once given the above disclosure many other features, modifications and improvements will become apparent to the skilled artisan. Such features, modifications and improvements are therefore considered to be a part of this invention, the scope of which is to be determined by the following claims:

What is claimed is:
1. Float glass comprising:
a float glass composition that includes:

| Ingredient | (wt. %) |
|---|---|
| $SiO_2$ | 67-69.5% |
| $Al_2O_3$ | 2.5-4.5% |
| $(SiO_2 + Al_2O_3)$ | <73% |
| $Na_2O$ | 16.6-20% |
| $K_2O$ | 0.5-2.0% |
| CaO | 4.0-7.0% |
| MgO | 2.5-3.5% |
| CaO + MgO | 6.5-10.5% | wherein the float glass is chemically strengthened and has a depth of layer, which is depth of a compressive stress layer in the glass resulting from the chemical strengthening, with a 4 hour chemical strengthening process at 435 degrees C. being used as a reference, of at least 25 µm.

2. The glass of claim 1, wherein the float glass is chemically strengthened and has a depth of layer, which is depth of a compressive stress layer in the glass resulting from the chemical strengthening, with a 4 hour chemical strengthening process at 435 degrees C. being used as a reference, of at least 26 µm.

3. The glass of claim 1, wherein the compressive stress layer has a maximum surface stress of from 450-550 MPa.

4. The glass of claim 1, wherein the glass has a Young's modulus of from 74-76.5 GPa.

5. The glass of claim 1, wherein the glass has a Young's modulus of from 74.5-75.5 GPa.

6. The glass of claim 1, wherein the glass comprises from 67.5-68.5 $SiO_2$.

7. The glass of claim 1, wherein the glass comprises from 2.7-3.4% $Al_2O_3$.

8. The glass of claim 1, wherein the glass comprises from 18-19% $Na_2O$.

9. The glass of claim 1, wherein the glass comprises from 5.0-7.0% CaO.

10. The glass of claim 1, wherein the glass comprises from 5.5-6.5% CaO.

11. The glass of claim 1, wherein the glass comprises from 2.8-3.2% MgO.

12. The glass of claim 1, wherein the glass comprises from 7.5-10.5% CaO +MgO.

13. The glass of claim 1, wherein the glass comprises from 8.5-9.7% CaO +MgO.

14. The glass of claim 1, wherein CaO %/MgO % is from 1.2-2.8.

15. The glass of claim 1, wherein in the glass the ratio CaO %/MgO % is from 1.8 to 2.3.

16. The glass of claim 1, wherein the glass comprises from 67.5-68.5 $SiO_2$, from 2.7-3.4% $Al_2O_3$, from 18-19% $Na_2O$, and from 5.5-6.5% CaO.

17. The glass of claim 1, wherein the glass has a visible transmission Lta of at least about 60%.

18. Chemically strengthened float glass comprising:
a float glass composition that is chemically strengthened and includes:

| Ingredient | (wt. %) |
|---|---|
| $SiO_2$ | 67-69.5% |
| $Al_2O_3$ | 2.5-4.5% |
| $(SiO_2 + Al_2O_3)$ | <73% |
| $Na_2O$ | 16.6-20% |
| $K_2O$ | 0.5-2.0% |
| CaO | 4.0-7.0% |
| MgO | 2.5-3.5% |
| CaO + MgO | 6.5-10.5% | wherein the glass has a depth of layer, which is depth of a compressive stress layer in the glass resulting from the chemical strengthening, of at least 25 µm.

19. The glass of claim 18, wherein the compressive stress layer has a maximum surface stress of from 450-550 MPa.

20. The glass of claim 18, wherein the glass comprises from 67.5-68.5 $SiO_2$.

21. The glass of claim 18, wherein the glass comprises from 2.7-3.4% $Al_2O_3$.

22. The glass of claim 18, wherein the glass comprises from 18-19% $Na_2O$.

23. The glass of claim 18, wherein the glass comprises from 5.0-7.0% CaO.

24. The glass of claim 18, wherein the glass comprises from 5.5-6.5% CaO.

25. The glass of claim 18, wherein the glass comprises from 67.5-68.5 $SiO_2$, from 2.7-3.4% $Al_2O_3$, from 18-19% $Na_2O$, and from 5.5-6.5% CaO.

* * * * *